No. 855,243. PATENTED MAY 28, 1907.
F. D. GREEN & J. P. MacLEARN.
APPARATUS FOR CHARGING LIQUIDS WITH CARBONIC ACID GAS.
APPLICATION FILED JULY 5, 1902.

2 SHEETS—SHEET 1.

Witnesses:—
Chas. F. DeCoy
Hamilton D. Turner

Inventors
Frank D. Green,
John P. MacLearn,
by their Attorneys
Hirom & Hirom

No. 855,243. PATENTED MAY 28, 1907.
F. D. GREEN & J. P. MacLEARN.
APPARATUS FOR CHARGING LIQUIDS WITH CARBONIC ACID GAS.
APPLICATION FILED JULY 5, 1902.

2 SHEETS—SHEET 2.

Witnesses:-
Chas. D. Cox
Hamilton D. Turner

Inventors:
Frank D. Green,
John P. MacLearn,
by their Attorneys
Howson & Howson

UNITED STATES PATENT OFFICE.

FRANK D. GREEN AND JOHN P. MacLEARN, OF PHILADELPHIA, PENNSYLVANIA; SAID MacLEARN ASSIGNOR TO SAID GREEN.

APPARATUS FOR CHARGING LIQUIDS WITH CARBONIC-ACID GAS.

No. 855,243.    Specification of Letters Patent.    Patented May 28, 1907.

Application filed July 5, 1902. Serial No. 114,470.

*To all whom it may concern:*

Be it known that we, FRANK D. GREEN and JOHN P. MACLEARN, citizens of the United States, and residents of Philadelphia, Pennsylvania, have invented certain Improvements in Apparatus for Charging Liquids with Carbonic-Acid Gas, of which the following is a specification.

Our invention relates to apparatus for impregnating a liquid, usually water, with carbonic acid gas.

One object of our invention is to insure a rapid and thorough commingling of the gas and liquid during the feeding of the gas, and a further object of our invention is to provide an apparatus, duplex in form, that is adapted to work continuously, that is to say, one portion of the same will always be carbonating or storing liquid, while a corresponding portion of the apparatus is discharging liquid which has been carbonated.

Figure 1:
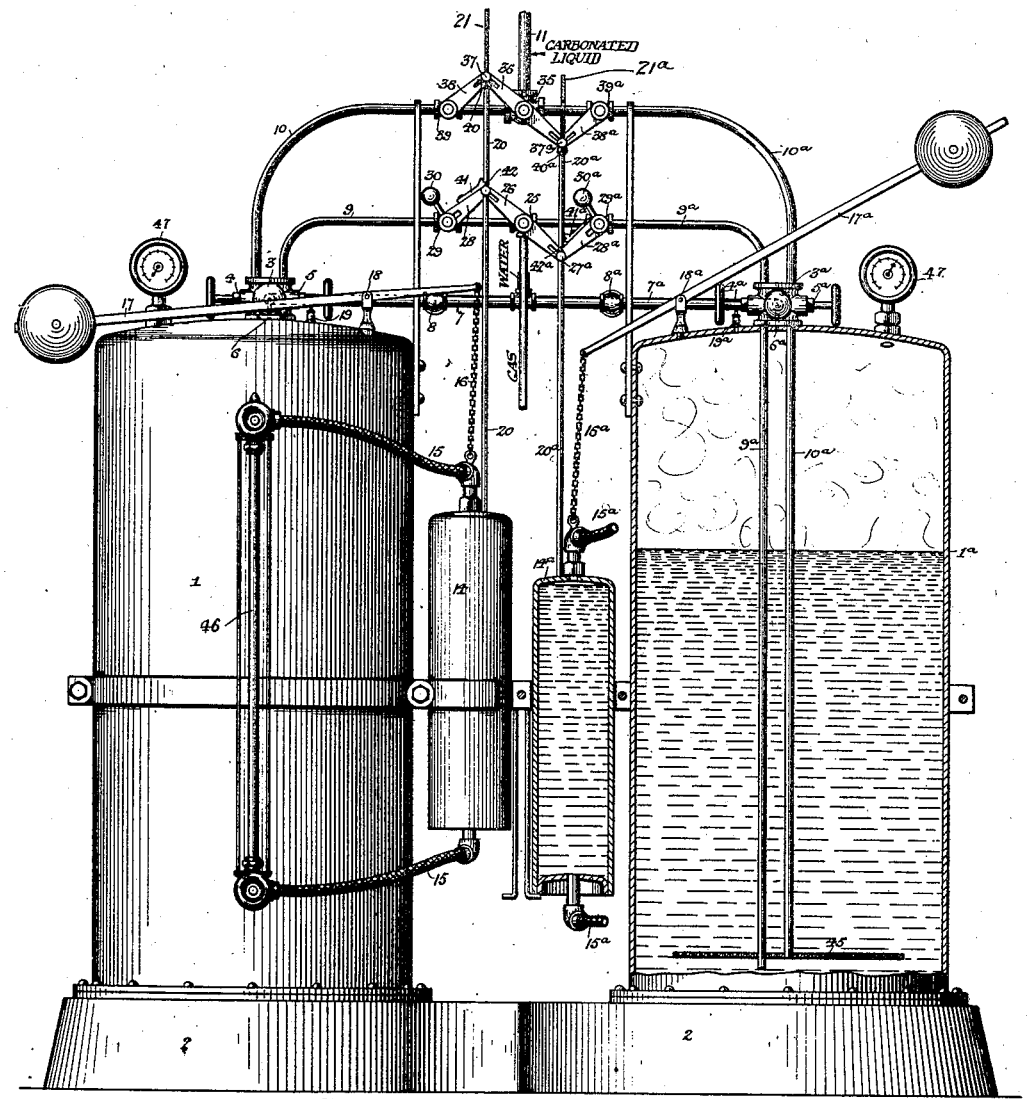
Figure 2:
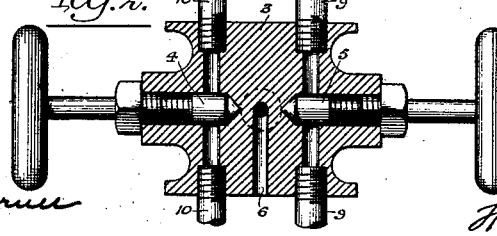
Figure 3:
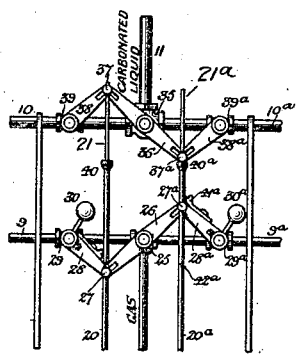

Other features, as well as the details of our invention will be pointed out hereinafter, reference being had to the accompanying drawings, in which:

Figure 1, is an elevation, partly in section, of the improved apparatus forming the subject of our invention; Fig. 2, is a sectional view illustrating a detail of our invention, and Figs. 3 to 5, inclusive, are diagram views illustrating a detail of our invention.

In the improved apparatus which we have devised, we have dispensed with the use of an auxiliary pump to effect the entrance of the liquid to be carbonated. In apparatus where pumps are employed, great difficulty exists when recharging the same, for the reason that the pressure in the tank frequently overcomes the pressure exerted by the pump, resulting in the straining of the latter or its operating mechanism. Moreover, when pumps are used, the valves and packings are liable to leak, or permit the gas to back up the water supply with consequent loss of gas. A further reason for dispensing with the use of a pump is because such device throws a very small stream, entailing considerable labor when the work is done by hand, and considerable loss of time when such work is done by the aid of power. In our apparatus, we prefer to blow off all the vapor of gas and air remaining from each previous charge, and we have found that this operation is very inexpensive, for the reason that the vapor so discharged is of little commercial value, as it is down to a very low pressure after the liquid contents of the tank have been drawn off, and also because it is largely an admixture of air which has been displaced from the liquid by the gas on the entrance of the latter into the carbonating tank.

In the accompanying drawings, 1 and $1^a$ represent tanks of suitable dimensions, which are preferably supported by a common base 2. In these tanks the liquid to be charged is stored. At the top of each tank is a multiple valve casing 3 and $3^a$ having three outlets or passages, two of which are controlled by the valves 4 and $4^a$, and 5 and $5^a$. The outlets 6 and $6^a$ for the passage of water are not controlled by valves, as the water pipes 7 and $7^a$ are provided with suitable cut-off or check valves 8 and $8^a$, and after a tank has been charged, the gas in the upper portion of the same will back into the pipe 7 or $7^a$ and close the check valve 8 or $8^a$ of the same, cutting off the flow of liquid to that particular tank.

Communicating with through openings in each of the multiple valve casings 3 and $3^a$ are the pipes 9 and $9^a$, and 10 and $10^a$; the pipes 9 and $9^a$ serving to convey into the tank the gas from any suitable source of supply, while the pipes 10 and $10^a$ serve to carry off and discharge into a suitable pipe 11 the carbonated or charged liquid. Each of the through openings for the pipes 9 and $9^a$, and 10 and $10^a$ is provided with valves 4 and $4^a$, and 5 and $5^a$, as before noted whereby inlet and outlet may be cut off at the casings 3 and $3^a$, but in practice these valves are normally open, as the passage of the gas and liquid respectively through said pipes 9 and 10 is controlled by other valves shortly to be described.

Suitably guided on the outside of the tanks 1 and $1^a$, are the balance tanks or cylinders 14 and $14^a$, each of which communicates with the interior of the tanks 1 and $1^a$, preferably by means of the rubber tubing shown at 15 and $15^a$. The upper portion of each tank is connected by means of chains 16 and $16^a$ to weighted levers 17 and $17^a$ pivoted at 18 and $18^a$ to the top of the tanks 1 and $1^a$, one of which levers, when either of the tanks 14 or $14^a$ is light, tends to raise the same and when said tank is in a raised position and the lever is in a lowered position, the latter is arranged to open an air vent valve 19 or 19ᵃ arranged in the upper portion of the tank. To each tank 14 and 14ᵃ rods 20 and 20ᵃ are secured, which rods serve to operate a series of valves controlling the passage of gas to the tanks and the passage of the carbonated liquid away from such tanks.

In the drawings, the T-section 25 carries a two-armed lever 26 with pivotal connections at 27 and 27ᵃ to the weighted levers 28 and 28ᵃ controlling the gas valves 29 and 29ᵃ. Each lever 28 and 28ᵃ is provided with a weight 30 and 30ᵃ for a purpose shortly to be described.

The T-section 35 carries the two-armed lever 36, to each end of which at 37 and 37ᵃ are pivoted the levers 38 and 38ᵃ controlling the valves 39 and 39ᵃ which directly control the passage of the carbonated water.

The rods 20 and 20ᵃ are in operative engagement at certain times, as set forth hereinafter, with the two-armed lever 26 controlling the gas valves 29 and 29ᵃ, and have extensions 21 and 21ᵃ which pass through the connections at 37 and 37ᵃ of the two-armed lever 36 controlling the carbonated liquid valves 39 and 39ᵃ. However, in order that such valves may be operated, said rods are provided with stops 40 and 40ᵃ suitably secured thereto and bearing against the pivotal connections of the two-armed lever 36. It will thus be seen, therefore, that as the tanks 14 and 14ᵃ alternately rise and fall, they will alternately open and close the several valves 29 and 29ᵃ, and 39 and 39ᵃ, the gas being alternately directed to the tanks 1 and 1ᵃ and the carbonated liquid discharged alternately from said tanks.

Carried by each of the levers 28 and 28ᵃ, are spring controlled pawls 41 and 41ᵃ adapted to engage notches 42 and 42ᵃ formed in the rods 20 and 20ᵃ, the result of such connections being that, when either of said rods is moved downward, such movement will open one of the gas valves 29 and 29ᵃ and close the other, the one opened being the one whose lever has its spring pawl 41 or 41ᵃ in engagement with the notch of the rods 20 and 20ᵃ. The valve that is opened by the downward movement of the rod, is opened gradually, until its weight passes the center while the valve that is closed by such action is closed rapidly by reason of the weight 30 or 30ᵃ falling over as soon as the lever passes the center; the rapid movement taking place in the final opening and closing of the respective valves. The rods engage the spring pawls of the valve levers only on the downward movement, such rods sliding freely past said pawls when raised. It is quite essential that the gas valves be closed rapidly, in order to promptly shut off the supply of gas and prevent any loss of the same.

The tanks may have means for assisting the admixture of gas and liquid, such as the perforated disk 45, and the gas pipe entering each of said tanks is carried beneath said disk so that the gas entering the tank passes under this plate and passing upward through the perforations of said plate, slowly bubbles through the liquid in the tank. If desired the water may be introduced at the top of the tank in the form of spray, falling down through the atmosphere of gas remaining from the previous charge.

Figure 4:
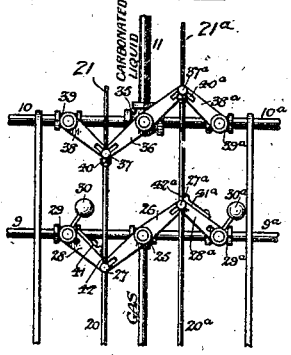
Figure 5:
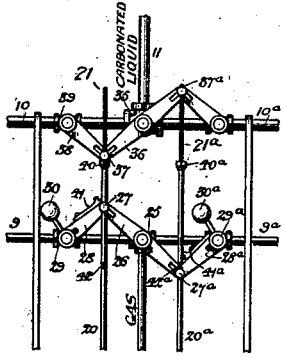

In the drawings, the tank 1 is supposed to be empty, while the tank 1ᵃ is filled and discharging its carbonated liquid. In practice, with the parts in position as shown in the drawings and as soon as the balance tank 14 has received, through one of the hose connections, sufficient liquid to overcome the weighted lever 17, said balance tank will fall, and in falling, carries with it the rod 20. As this rod only acts upon the levers controlling the valves of the carbonated liquid pipes when rising, said valves will be undisturbed. The rigid connection, however, with the levers controlling the gas valves is such that as soon as said balance tank falls, the gas valve 29 will be opened and the valve 29ᵃ shut, the closing of the latter being effected in a rapid manner, as described hereinbefore, and the valves will be in the position shown in Fig. 3. The gas will now flow into the tank 1 until it fills the space unoccupied by the liquid, and as it is introduced into said tank in such a way as to thoroughly impregnate such liquid, the latter becomes thoroughly charged and is ready for use. The entrance of the gas into the tanks also serves the purpose of cutting off the flow of liquid to the same, by closing the check valves 8 or 8ᵃ controlling the flow. In the meanwhile, the tank 1ᵃ has been discharging its carbonated liquid, until the balance tank becoming light and the weighted lever 17ᵃ overcoming the weight of the same, said tank rises and carries up the rod 20ᵃ which shifts the lever 36 carried by the T-section 35 and changes the position of the valves 39 and 39ᵃ controlling the passage of the carbonated liquid, as illustrated in Fig. 4. The gas valve having been shifted as previously noted, so that, in its changed position, both of the valves 29ᵃ and 39ᵃ are closed, the lowered position of the weighted lever 17ᵃ opens the vent valve, permitting the escape of the vapor in the tank 1ᵃ remaining from the previous charge, so that liquid flows readily into said tank. As has been noted with reference to the tank 1ᵃ, the liquid also enters the balance tank 14ᵃ, and as soon as a sufficient quantity has entered said tank to overcome the resistance of said weighted lever, the tank 14ᵃ drops. As noted with regard to the tank 14, this action carries down the rod 20ᵃ which does not disturb the valve 39ᵃ, but leaves it in its closed position, while the valve 29ᵃ opens and the valve 29 closes, with the result that the gas will flow into the tank 1ᵃ and charge the liquid which has previously run into the same. This tank is now shut off from tank 1, from which the carbonated liquid is being drawn off, and there is no possibility of a waste of gas, the valves being in the position shown in Fig. 5.

Although we have shown and described certain means for changing the relative positions of the several valves employed with our improved apparatus, we do not wish to be limited to such construction, as it will be evident that various modifications may be adopted to perform the same result.

We have shown our apparatus as equipped with liquid gages or glasses 46, and pressure gages 47 mounted on top of the tanks.

Having thus described our invention, we claim and desire to secure by Letters Patent:

1. In carbonating apparatus, the combination of liquid containing means, means for introducing liquid thereto, means for automatically controlling the introduction of such liquid, means for introducing a charging gas thereto, means controlling the inlet of gas to said liquid containing means, means for drawing off the charged liquid, and mechanism for automatically operating said gas controlling means and the means for drawing off the charged liquid.

2. In a carbonating apparatus, the combination of a tank, means for introducing liquid and a charging gas thereto, means for drawing off the charged liquid, mechanism for controlling the inlet of gas, mechanism for controlling the outlet of the charged liquid, and means for operating said controlling mechanisms, said operating means serving to actuate certain parts of said controlling mechanisms independently of the others.

3. In a carbonating apparatus, the combination of a plurality of tanks, means for introducing liquid and a charging gas thereto, a pipe for drawing off the charged liquid, valves controlling the inlet of gas, valves controlling the outlet of the charged liquid, levers connected to said valves, and means for operating said levers whereby certain of the valves may be opened and closed independently of the others.

4. In a carbonating apparatus, the combination of a plurality of tanks, means for supplying gas and liquid to said tank, a discharge pipe for the carbonated liquid, valves controlling the inlet of gas and the outlet of the charged liquid, levers controlling the movement of said valves, vertically moving members in communication with the contents of said tanks, and means connected with said vertically moving members whereby certain of the valves may be operated by the same independently of the movement of the others.

5. In a carbonating apparatus, the combination of a plurality of tanks, means for supplying gas and liquid to said tank, a discharge pipe for the carbonated liquid, valves controlling the inlet of liquid and gas and the outlet of the charged liquid, levers controlling the movement of the gas and the charged liquid valves, vertically moving members in communication with the contents of said tanks, said members adapted to rise as their respective tank empties of its liquid, and fall as the tank fills, and means connecting said movable members with the levers controlling certain of the valves whereby they may be operated by the rise and fall of the vertically moving members.

6. In a carbonating apparatus, a plurality of tanks, means for alternately supplying said tanks with liquid and gas, discharge pipes for the carbonated liquid, independent movable tanks in communication with the main tanks, valves controlling the inlet of liquid and gas and the discharge of the carbonated liquid, levers controlling the gas and the charged liquid valves, and means carried by the movable tanks in operative connection with said levers whereby the rise and fall of the movable tanks will actuate said levers to operate the valves.

7. In a carbonating device, a plurality of tanks, means for alternately supplying the tanks with liquid and gas, air vent valves carried by said tanks, means for opening said valves prior to the introduction of liquid to the tanks, auxiliary movable balance tanks in communication with said main tanks, said movable tanks, when falling, permitting the closing of the air vent valves, valves for controlling the inlet of gas to each tank alternately, valves for controlling the discharge of the carbonated liquid from each tank alternately, connections between said valves and the movable tanks, and means whereby the charged liquid valves will be actuated by the rise of the movable tanks, while the gas valves will be operated by the fall of said tanks.

8. In a carbonating apparatus, the combination with the main tanks and the pipes leading thereto for the passage of gas and carbonated liquid, of valves controlling the passage of gas and the carbonated liquid, the respective valves being coupled by suitable levers, movable members adjacent to the tanks, and connections between said movable members and the levers of the valves whereby the latter will be operated by the rise and fall of said movable members, one set of valves being moved by the rise of said movable members, while the other set is moved by the fall of said members.

9. The combination in an apparatus of the character described, of the main tanks, pipes communicating therewith for the passage of gas and carbonated liquid, auxiliary movable tanks in communication with the main tank, valves controlling the inlet of gas and discharge of the carbonated liquid, levers for coupling the respective valves, rods carried by the auxiliary tanks and adapted to engage said levers, one set of valves being moved by the rise of the auxiliary tanks, and the other by the fall of the same, means connecting the gas valves and rods whereby said valves may be opened gradually, and means for closing said valves quickly.

10. The combination in an apparatus of the character described, of the two main tanks, means for introducing liquid into the same, means for introducing gas to said liquid and discharging the carbonated liquid, valves controlling the entrance of the gas and the discharge of the carbonated liquid, movable members in communication with the liquid in the tanks, said members being adapted to rise and fall and controlling in their movement the position of the valves, and means for automatically causing a change of flow of gas and carbonated liquid to and from the main tanks as they fill and discharge.

11. In a carbonating apparatus, the combination of a tank, valved pipes for supplying a charging gas and liquid to said tank, a discharge pipe for the charged liquid, mechanism controlling the inlet of gas and the outlet of the charged liquid, a movable liquid container in communication with said tank, and means connected with said movable liquid container for operating the mechanism controlling the inlet of gas and the outlet of the charged liquid.

12. In a carbonating apparatus, the combination of a tank, valved pipes for supplying a charging gas and liquid to said tank, a discharge pipe for the charged liquid, mechanism controlling the inlet of gas and the outlet of the charged liquid, a movable liquid container in communication with said tank, and means connected to said movable liquid container for operating the mechanism controlling the inlet of gas and the outlet of the charged liquid, said operating means serving to actuate certain parts of said controlling mechanism independently of the others.

13. In a carbonating apparatus, the combination of a tank, means for supplying a charging gas and liquid to said tank, a discharge pipe for the carbonating liquid, valves controlling the inlet of gas and the outlet of the charged liquid, levers controlling the movement of said valves, a moving member in communication with the contents of said tank, and means connected with said moving member whereby certain of the valves may be operated by the same independently of the movement of the others.

14. In a carbonating apparatus, the combination of a series of tanks, means for supplying a charging gas and liquid to said tanks, discharge pipes for the carbonated liquid, valves controlling the inlet of gas and the outlet of the charged liquid to and from said tanks, levers for moving said valves, and means for operating said levers whereby the valves of each tank may be operated independently of the movement of the others.

15. In a carbonating apparatus, the combination of a series of tanks, means for supplying a charging gas and liquid to said tanks, a discharge pipe for the carbonated liquid, mechanism controlling the inlet of gas and the outlet of the charged liquid to and from said tanks, movable liquid containers in communication with said tanks, and means connected with said movable liquid containers whereby the mechanisms controlling the inlet of gas and the outlet of charged liquid to each tank may be alternately and independently operated.

16. In a carbonating apparatus, the combination of a series of tanks, means for supplying gas and liquid to said tanks, a discharge pipe for the carbonated liquid, valves controlling the inlet of gas and the outlet of the charged liquid alternately to and from said tanks, levers controlling the movement of said valves, moving members in communication with the contents of said tanks, and means connected with said moving members whereby certain of the valves may be operated by the same alternately, independently of the movement of the others.

17. In a carbonator or similar device, automatic means for admitting gas when a predetermined quantity of water is in the carbonator, automatic means for admitting water, and means for permitting air to escape until the predetermined amount of water is in the carbonator.

18. In a carbonator or similar device, automatic means for admitting water to the carbonator, means for admitting gas when a predetermined quantity of water is in the carbonator, whereby additional pressure is developed in the carbonator and the water supply cut off, and means for allowing both air and gas to escape from the carbonator when water is being admitted thereto, and until the water obtains a certain level.

19. In a carbonator or similar device, automatic means for admitting water until a certain pressure is developed in the carbonator when the water is shut off, means for admitting and shutting off gas, said means acting to admit gas when the water has reached a predetermined level and to shut off the gas supply when the water has fallen to a second level, and means for permitting air or gas to escape from the carbonator when water is being admitted and the gas supply is shut off.

In testimony whereof, we have signed our names to this specification, in the presence of two subscribing witnesses.

FRANK D. GREEN.
JOHN P. MacLEARN.

Witnesses:
N. B. WILEY,
EDGAR L. GREEN.